United States Patent
Curry et al.

(10) Patent No.: US 11,878,914 B2
(45) Date of Patent: Jan. 23, 2024

(54) HIGH-THROUGHPUT SYNTHESIS OF METALLIC NANOPARTICLES

(71) Applicant: Tuskegee University, Tuskegee, AL (US)

(72) Inventors: Michael L. Curry, Tuskegee, AL (US); Aiesha L. Ethridge, Tuskegee, AL (US); Demetrius Finley, Tuskegee, AL (US)

(73) Assignee: TUSKEGEE UNIVERSITY, Tuskegee, AL (US)

( * ) Notice: Subject to any disclaimer, the term of this patent is extended or adjusted under 35 U.S.C. 154(b) by 185 days.

(21) Appl. No.: 17/175,137

(22) Filed: Feb. 12, 2021

(65) Prior Publication Data

US 2021/0261431 A1    Aug. 26, 2021

Related U.S. Application Data

(62) Division of application No. 15/987,561, filed on May 23, 2018, now abandoned.

(Continued)

(51) Int. Cl.
*C01G 3/02* (2006.01)
*B01J 19/24* (2006.01)
(Continued)

(52) U.S. Cl.
CPC .............. *C01G 3/02* (2013.01); *B01J 19/123* (2013.01); *B01J 19/24* (2013.01); *B22F 9/24* (2013.01); *B01J 2219/0869* (2013.01); *B01J 2219/1203* (2013.01); *B01J 2219/24* (2013.01); *B22F 1/054* (2022.01); *B22F 1/102* (2022.01); *B22F 2301/10* (2013.01); *B22F 2302/25* (2013.01); *B82Y 40/00* (2013.01); *C01P 2002/72* (2013.01); *C01P 2002/84* (2013.01); *C01P 2002/85* (2013.01); *C01P 2004/01* (2013.01); *C01P 2004/04* (2013.01); *C01P 2004/32* (2013.01); *C01P 2004/64* (2013.01)

(58) Field of Classification Search
None
See application file for complete search history.

(56) References Cited

U.S. PATENT DOCUMENTS

| 2011/0048171 A1* | 3/2011 | Enright | B22F 9/24 |
| | | | 75/345 |
| 2014/0026714 A1* | 1/2014 | Murphy | B22F 9/24 |
| | | | 422/187 |
| 2016/0121402 A1* | 5/2016 | Kim | B22F 9/24 |
| | | | 75/370 |

OTHER PUBLICATIONS

Niu et al (Removal and Utilization of Capping Agents in Nanocatalysis, Chem. Mater. (2014), 26, 72-83). (Year: 2014).*

(Continued)

*Primary Examiner* — Paul A Wartalowicz
*Assistant Examiner* — Michael Forrest
(74) *Attorney, Agent, or Firm* — Terry M. Sanks, Esq.; Beusse Sanks, PLLC

(57) ABSTRACT

This invention relates to cost-effective methods for synthesizing metallic nanoparticles in high yield using non-dendrimeric branched polymeric templates, such as branched polyethyleneimine. This invention also provides a high-throughput apparatus for synthesizing metallic nanoparticles under conditions that produce less waste than conventional nanoparticle synthesis methods. Also provided are metallic nanoparticles and multi-metallic nanoparticle compositions made by methods and high-throughput apparatus of the invention.

19 Claims, 12 Drawing Sheets

Related U.S. Application Data

(60) Provisional application No. 62/510,104, filed on May 23, 2017.

(51) Int. Cl.
*B01J 19/12* (2006.01)
*B22F 9/24* (2006.01)
*B82Y 40/00* (2011.01)
*B22F 1/054* (2022.01)
*B22F 1/102* (2022.01)

(56) References Cited

OTHER PUBLICATIONS

Kanninen et al (Influence of ligand structure on the stability and oxidation of copper nanoparticles, J Colloid and Inter Sci. 318 (2008) 88-95). (Year: 2008).*

* cited by examiner

HIGH-THROUGHPUT SYNTHESIS OF METALLIC NANOPARTICLES

RELATED APPLICATIONS

This application is a divisional application of U.S. Ser. No. 15/987,561, which was filed on May 23, 2018, which claims priority to provisional application 62/510,104, filed on May 23, 2017, which is herein incorporated in its entirety by reference.

GOVERNMENT LICENSE RIGHTS

This invention was made with government support under grant 00039202 awarded by the NSF under the Center for Sustainable Nanotechnology. The government has certain rights in the invention.

FIELD OF THE INVENTION

This invention relates to methods and reactors for producing metallic nanoparticles in high yield. The invention also relates to metallic nanoparticles prepared by the methods and reactors of the invention.

BACKGROUND OF THE INVENTION

Nanoparticles are small particles of matter with a diameter typically in the range of 1 to 100 nanometers. Nanoparticles are useful in many technological areas including medicine (e.g., drug delivery), energy generation (e.g., solar cells, fuel cells, etc.), and energy storage (e.g., batteries). Nanoparticles can be comprised of many different types of materials, including polymers, ceramics, metals, and proteins, to name just a few.

Nanoparticles can be synthesized in a variety of ways. For example, in gas phase synthesis, nanoparticles are formed by initially evaporating the constituent materials and then causing nucleation and growth of the nanoparticles, typically in an inert gas environment. Nanoparticle may also be formed using sol-gel processing, a wet-chemical technique in which certain chemical additives in a solution form small particles, resulting in a composition with the consistency of a gel. These particles may be isolated using precipitation and hydrothermal treatments. If desired, nanoparticles also may be formed from sol-gels using cavitation processing, which involves the creation and release of gas bubbles in the sol-gel. Nanoparticles may also be formed using dendrimers (a highly symmetrical synthetic polymer with a tree-like structure) as host template that stabilizes the nanoparticles against aggregation. Yet another method of forming nanoparticles involves a technique known as chemical vapor condensation, in which vapor phase precursors are brought into hot-wall chemical reactors under conditions that promote reaction to form nanoparticles. Nanoparticles may also be formed by sonochemical processing, which involves subjecting the constituent material to sudden pressure and temperature changes to form the nanoparticles. Grinding methods, such as high-energy ball milling, can also be used to create nanoparticles from larger particles.

While several methods for producing nanoparticles currently exist, these methods suffer from some substantial drawbacks. For example, some of the methods produce dangerous chemical waste as a by-product, which poses a significant environmental risk. Others are not cost-effective because they require the input of large amounts of energy, costly equipment, or costly reagents. For example, dendrimer-mediated production of nanoparticles is exceedingly expensive, making commercialization of such processes economically unfeasible. In addition, while some conventional methods are capable of producing nanoparticles, they may be unable to prevent undesirable aggregation or oxidation of the nanoparticles (e.g., high energy ball milling). Reproducibility and the ability to produce well-defined nanoparticles with characteristic shapes and sizes are also difficult to achieve with conventional methods for producing nanoparticles.

In view of these limitations, it would be advantageous to develop a new method of producing nanoparticles in high yield and with well-defined shapes and sizes. It would also be advantageous to develop an apparatus for making such nanoparticles in a cost-effective, environmentally friendly way.

SUMMARY OF THE INVENTION

The present invention relates to a novel flow reactor for the synthesis of Polyethyleneimine coated nanoparticles ("PEI-coated nanoparticles"). The inventors compared the resulting nanoparticles ("NPs") to those synthesized through traditional batch synthesis with the Polyamidoamine ("PAMAM") dendrimer. PEI was chosen as the capping agent because it is a low-cost alternative to the PAMAM dendrimer with known affinity for copper. In the flow reactor, metal salt solutions are premixed with PEI and subsequently reduced to metal zero via chemical reduction, while under steady flow conditions. However, immediate oxidation is observed due to exposure to ambient conditions, producing Cu NPs with a native oxide layer. The inventors provide comparative characterization of small-scale synthesized PAMAM- and large-scale synthesized PEI-capped copper nanoparticles using x-ray diffraction (XRD), transmission electron microscopy (TEM), and UV-vis spectroscopy to demonstrate the unexpected benefits of the flow reactors of the invention.

Although many advances have been made in the batch synthesis processing of metallic Cu and Cu-based nanoparticles, the inability to control agglomeration and size distribution during the scale-up process is a common drawback that remains unsolved. By using a flow reactor of the invention combined with the chemical reduction process and PEI as the chelating and stabilizing agent, nanoparticles with well-defined sizes and shapes can be achieved at the gram scale without significant aggregation. The flow reactor design is capable of high-throughput production of CuO nanoparticles with spherical morphology.

In the flow reactor, a peristaltic pump is used to drive fluids through millimeter-diameter tubing at flow rates that range between 0.4 mL/min and 85 mL/min. A flow rate of 20 mL/min was used to produce PEI-capped Cu nanoparticles. It should be noted that the flow rate used in this reactor will likely depend on the type of metal salt solution and reaction type chosen. The flow reactors of the invention provide a method of fabricating nanoparticles where the growth solution used contains only the polymer ligand and the metal salt (no ligand or seed nanoparticles are necessary). Subsequently, $NaBH_4$ (reducing agent) or ultraviolet light can be used to produce Cu-based NPs.

The invention exploits the ion-pair exchange chemistry that serves as the basis for PAMAM-dendrimer methods. Rather than using the expensive PAMAM dendrimer, the inventors used the secondary amine groups present in PEI to create the ligand-to-metal-charge transfer exchange to drive chemical reduction of the metal salt to form nanoparticles.

That is, in this reaction, coordination chemistry through ligand substitution is used to form bonds around the aqua-copper ions to form a Cu—NH bond. When a premixed aqueous solution of PEI and aqueous solution of copper salt was introduced into the flow reactor with various residence times (the amount of time the solution spends flowing in the tubing after it meets at the t-mixer), copper oxide NPs are formed. Upon exiting the flow reactor, the PEI-coated particles were freeze-dried to promote long-term stability until characterization or use.

Accordingly, in one aspect, the invention provides a method of synthesizing metallic nanoparticles. The method comprises providing a first flow stream comprising an aqueous solution comprising ions of a transition metal and a branched polymeric template, wherein the branched polymeric template is not a dendrimer. The first flow stream is subjected to a reducing agent to reduce the ions of the transition metal to form metallic nanoparticles within the branched polymeric template. Optionally, the metallic nanoparticles may be separated from the branched polymeric template.

In another aspect, the invention provides an apparatus for synthesizing metallic nanoparticles. The apparatus comprises a first device for providing a first flow stream comprising an aqueous solution comprising ions of a transition metal and a branched polymeric template, wherein the branched polymeric template is not a dendrimer. The apparatus further comprises a second device for providing a reducing agent that reduces the ions of the transition metal in the first flow stream, thereby forming metallic nanoparticles.

In yet another aspect, the invention provides a nanoparticle composition. The nanoparticle composition comprises a branched polymeric template, and a plurality of metallic nanoparticles disposed within the polymeric template.

BRIEF DESCRIPTION OF THE DRAWINGS

FIG. 9(a) TEM image of Cu nanoparticles prepared using convention PAMAM G4-mediated synthesis; FIG. 9(b) size distribution profile of Cu nanoparticles prepared using convention PAMAM G4-mediated synthesis; FIG. 9(c) TEM image of Cu nanoparticles made using a PEI branched polymeric template in accordance with the invention; FIG. 9(d) size distribution profile of Cu nanoparticles prepared using a PEI template according to one embodiment of the invention.

DETAILED DESCRIPTION OF THE INVENTION

Figure 1:
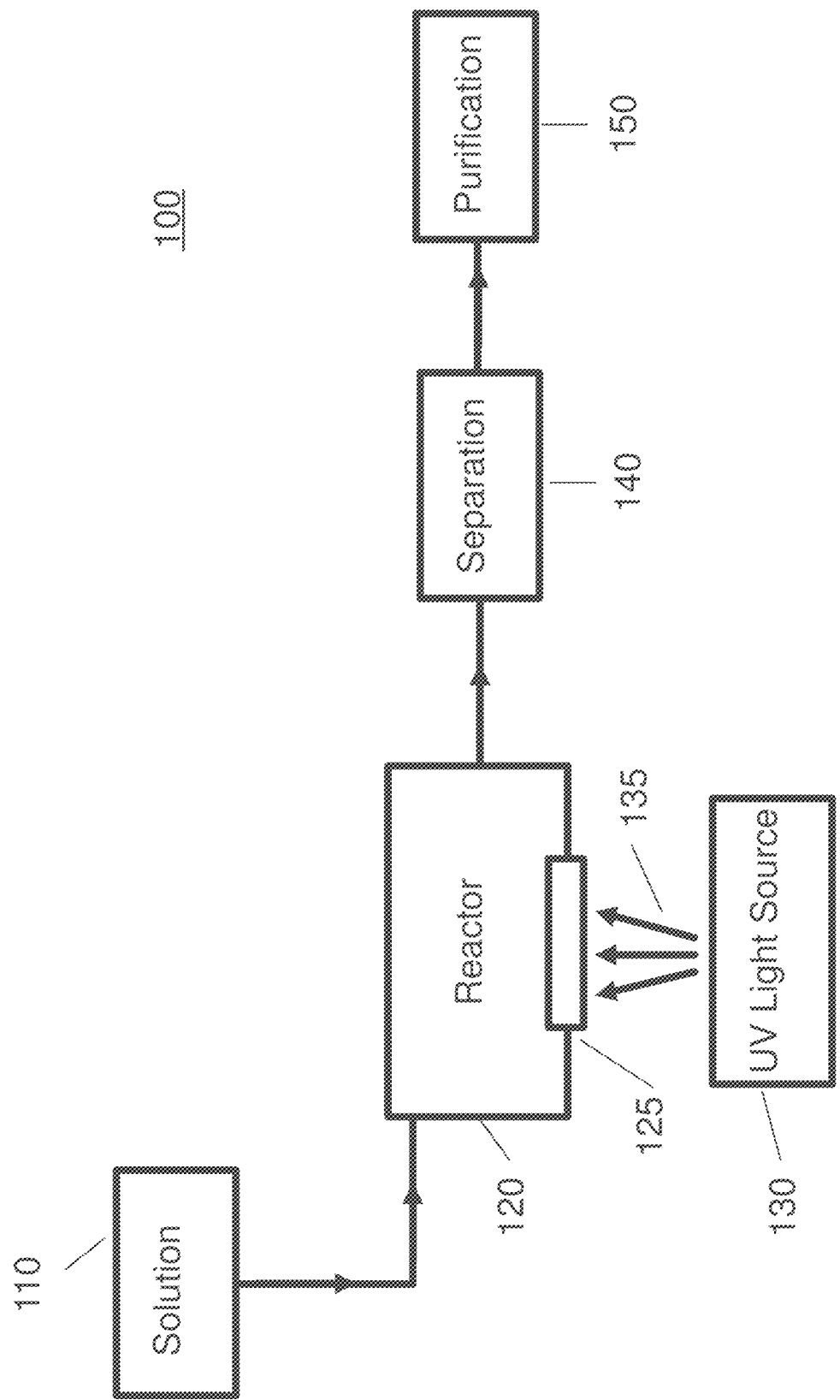
FIG. 1: A schematic illustration of an apparatus for producing metallic nanoparticles according to one embodiment of the invention.

In one aspect, this invention provides a method of producing metallic nanoparticles in a branched polymeric template. Among other things, this invention recognizes that non-dendrimer, branched polymeric templates are suitable for cost-effective production of metallic nanoparticles in high-yield using the reactors of the invention. By using the methods and reactors disclosed herein, the cost of forming metallic nanoparticles can be over 250 times cheaper than the cost of forming metallic nanoparticles using conventional, dendrimer-based methods. Moreover, the methods and reactors of the invention produce less waste compared to the conventional, dendrimer-based methods and reactors.

The metallic nanoparticles of the invention find use in a variety of different technologies. For example, copper-based nanoparticles can be used as additives in bioactive coatings. Nickel-based nanoparticles find use in catalysis. Cobalt-based nanoparticles are useful for information storage and also energy storage. Titanium- and zirconium-based nanoparticles find use as coatings and additives.

In one aspect, this invention provides a method of synthesizing metallic nanoparticles. The method comprises providing a first flow stream comprising an aqueous salt solution comprising ions of a transition metal and a branched polymeric template. The first flow stream is subjected to a reducing agent that causes the formation of metallic nanoparticles within the branched polymeric template. Using the methods and reactors disclosed herein, gram-scale quantities of nanoparticles can be obtained efficiently. For example, in certain preferred embodiments, the residence time of the first flow stream within the reactor (i.e., from the time when a portion of the first flow stream is introduced to the time when the formation of the metallic nanoparticles from that portion is substantially complete) is in the range of about 3 to about 15 minutes, about 4 to about 12 minutes, about 5 to about 10 minutes, or about 6 to about 8 minutes. After the metallic nanoparticles are formed, they are optionally separated from the branched polymeric template.

The term "metallic nanoparticle" as used herein refers to a particle that is substantially comprised of one or more transition metals and that has a maximum dimension in the range of 1 to 100 nanometers. While the metallic nanoparticles of the invention are preferably substantially spherical, certain embodiments of this invention contemplate metallic nanoparticles that are not substantially spherical. Non-spherical metallic nanoparticles may be produced by using branched polymeric templates with suitable morphologies to promote anisotropic growth, thereby leading to metallic particles with non-spherical shapes. Alternatively, non-spherical metallic nanoparticles may be produced by adding capping reagents that preferentially bind to certain crystalline faces of the metallic nanoparticles as they form. In this way, growth in certain crystalline directions is kinetically limited, leading to anisotropic growth and non-spherical metallic nanoparticles. In certain preferred embodiments, the invention provides methods for forming metallic nanoparticle compositions in which the metallic nanoparticles are substantially uniform in size. In this context, the term "substantially uniform" means that the magnitude of the standard deviation of the particle size is 25% or less of the average particle size.

The metallic nanoparticles contemplated by the invention may comprise one or more types of metal. In general, suitable metals are typically transition metals, non-limiting examples of which include iron, cobalt, rhodium, iridium, nickel, palladium, platinum; copper, silver, gold, zirconium, and titanium. When the metallic nanoparticles comprise two or more different metals, the distribution of the metals within the metallic nanoparticles may be controlled by varying the processing conditions. As described herein, the metallic nanoparticles of the invention are formed within a branched polymeric template by exposing the branched polymeric template to a salt solution containing transition metal ions and then reducing the transition metal ions to form the metallic nanoparticles within the branched polymeric template. Thus, metallic nanoparticles comprising a random distribution of two or more metals may be formed by adding different types of transition metal salts to the salt solution before combining the salt solution with the branched polymeric templates and reducing the metal ions to form metallic nanoparticles. In an alternative embodiment, the different types of metals in the metallic nanoparticles may be arranged in concentric layers by sequentially exposing the branched polymeric templates to a series of salt solutions, each comprising a different type of transition metal ion, and reducing the transition metal ions in the particular solution before exposing the branched polymeric templates to the next salt solution. Hybrid approaches comprising single metal layers in combination with multi-metallic layers are also expressly contemplated by the invention.

The salt solutions containing the transition metal ions that are to be reduced in order to form the metallic nanoparticles of the invention are typically aqueous solutions that contain one or more dissolved transition metal salts. In general, any transition metal salt that is soluble in an aqueous solution may be used, with transition metal halides, nitrates, sulfates, and phosphates being preferred. Preferably, the salt solutions contain transition metal ions present at a concentration in the range of about 1 µM to 200 mM, more preferably in the range of 1 µM to 20 mM, and most preferably in the range of about 1 µM to about 1 mM. Salt solutions containing two or more different soluble transition metal salts are also contemplated by the invention.

As used herein, the term "branched polymeric template" refers to a carbon-based, branched polymeric structure that is not a dendrimer and that comprises heteroatoms capable of coordinating with a metal atom, such as a transition metal atom. Non-limiting examples of such heteroatoms include nitrogen, oxygen, phosphorus, and sulfur, with nitrogen being particularly preferred. By way of example, in certain preferred embodiments, the branched polymeric template is a polyalkyleneimine, with polyethyleneimine and polypropyleneimine being particularly preferred. Examples of oxygen-containing branched polymeric templates include branched polyethers and branched polyesters. Examples of sulfur-containing branched polymeric templates include branched thioesters and branched polysulfides. In general, the size of the branched polymeric templates is not particularly limited and can be any size in which permits the diffusion of metal ions therein and extraction of the metallic nanoparticles once they are fully formed. Non-limiting examples of suitable branched polymeric templates include those that have a number average molecular mass ($M_e$) in the range of about 5,000 to about 15,000, about 7,000 to about 13,000, about 8,000 to about 12,000 and most preferably, about 10,000.

As described herein, the metallic nanoparticles according to the invention typically are formed by reducing the transition metal ions in the metal salt solutions, thereby causing the formation of metallic nanoparticles in the branched polymeric templates. Without wishing to be limited by theory, it is believed that the transition metal ions are initially chelated to the heteroatoms of the branched polymeric template, and that these chelation sites act as nucleation centers for the growth of the metallic nanoparticles. Thus, in preferred embodiments, the metal salt solutions are combined with the branched polymeric templates before exposure to a reducing agent. In preferred embodiments, the metallic nanoparticles are produced by a continuous flow process. For example, the metal salt and the branched polymeric template may be premixed in a solution which is delivered as a first flow stream that is subsequently subjected to a reducing agent. Alternatively, a flow stream comprising a metal salt solution may be combined with a flow stream comprising the branched polymeric template in order to form a first flow stream that is subsequently subjected to a reducing agent. The invention also contemplates other embodiments wherein a flow stream comprising transition metal ions is exposed to a reactor in which the branched polymeric template is dispersed on a high-surface-area support, such as mesoporous silica. This promotes mixing and efficient chelation of the transition metal ions by the heteroatoms in the branched polymeric template. Subsequently, the transition metal ion/branched polymeric template composition can be exposed to a reducing agent as described herein.

One of the methods contemplated by the invention for reducing the transition metal ions in the salt solutions involves exposing the transition metal ions to a chemical reducing agent. For example, in certain embodiments, the chemical reducing agent is a metal hydride, non-limiting examples of which include sodium borohydride, lithium aluminum hydride, and lithium triethylborohydride. When the reducing agent is a chemical reducing agent, it is preferable to select a branched polymer template that does not contain any functional groups that would react with the chemical reducing agent, in order to avoid the possibility of undesirable side reactions. For instance, when the chemical reducing agent is a metal hydride, it is preferable that the branched polymeric template does not contain any ester groups (e.g., polyester), which could undergo competing reduction reactions involving the carbonyl moiety of the ester groups and the hydride. Thus, when the chemical reducing agent is a metal hydride, preferred branched polymeric templates include polyalkyleneimines, such as polyethyleneimine (PEI) and polypropyleneimine (PPI), for example. In preferred embodiments, the chemical reducing agent is introduced into the reactor in a second flow stream that is combined with the first flow stream comprising the metal salt solution.

In addition to chemical reducing agents, the invention also specifically contemplates forming metallic nanoparticles in a branched polymeric template by photoreducing transition metal ions in a salt solution, typically after the salt solution has been combined with the branched polymeric template. In certain embodiments, the photoreduction is accomplished by irradiating the first flow stream comprising the transition-metal-ion-containing salt solution and the branched polymeric template with ultraviolet light. Suitable ultraviolet light sources include any that (1) produce ultraviolet radiation with a wavelength that causes photoreduction reactions of transition metal ions to occur; and (2) has a sufficient photon flux to cause the growth of metallic nanoparticles at a reasonable rate. By way of example, ultraviolet light sources contemplated by the invention include mercury lamps, xenon arc lamps, mercury-xenon arc lamps, deuterium arc lamps, metal halide arc lamps, and tungsten-halogen incandescent lamps. In a particularly preferred embodiment, the ultraviolet light source is a monochromatic source that provides ultraviolet light at a wavelength of 254 nm. In other embodiments, the photoreduction reaction is accomplished using visible light in connection with a photocatalytic material that is capable of acting as an electron source for the photoreduction reaction. Non-limiting examples of such photocatalytic materials include certain metal oxides (e.g., TiO) as well as certain types of chemical dyes (e.g., erythrosin).

After the metallic nanoparticles have been formed within the branched polymeric template, they may be recovered from the branched polymeric template, if desired. Recovery may be accomplished using a variety of different techniques. For example, recovery of the metallic nanoparticles from a branched polymeric template may be accomplished by using a ligand exchange reaction to functionalize the metallic nanoparticles, thereby facilitating the extraction of the metallic nanoparticles from the branched polymeric template. In one exemplary embodiment, metallic nanoparticles are functionalized by adding dodecanethiol to the metallic nanoparticle/branched polymeric template mixture. Without wishing to be limited by theory, it is believed that the thiol groups of the added dodecanethiol bind to the surfaces of the metallic nanoparticles, rendering them more mobile and able to diffuse out of the branched polymeric template. If desired, the metallic nanoparticles may be recovered using diafiltration, a membrane based separation method that can separate the metallic nanoparticles from the branched polymeric template. Alternatively, the branched polymeric template may be removed by subjecting the metallic nanoparticle/branched polymeric template composition, after drying, to an oxygen plasma. The oxygen plasma selectively etches away the branched polymeric template and any other organic material, leaving behind the metallic nanoparticles.

The invention also provides an apparatus for manufacturing the metallic nanoparticles according to the invention. Broadly speaking, the apparatus comprises a first device for delivering an aqueous solution comprising ions of a transition metal and a branched polymeric template in a first flow stream. The apparatus further comprises a second device for reducing the transition metal ions of the salt solutions. In certain embodiments, the second device provides a second flow stream comprising a chemical reducing agent that mixes (preferably under conditions of continuous flow) to cause formation of the metallic nanoparticles within the branched polymeric template. Moreover, instead of delivering a chemical reducing agent, the second device may be a light source that is capable of causing the photoreduction of the transition metal ions in the salt solution that have been combined with the branched polymeric template. If desired, the apparatus may comprise additional purification units (e.g., a diafiltration unit) that optionally may be fluidly connected to the reactor. In preferred embodiments, the apparatus for producing metallic nanoparticles according to the invention is a continuous flow reactor.

FIG. 1 shows a schematic diagram of an apparatus 100 for producing metallic nanoparticles according to one exemplary implementation of the invention. In FIG. 1, device 110 is fluidly connected to reactor 120. Device 110 contains a salt solution of a transition metal salt and, when needed, delivers the salt solution to reactor 120 via its fluid connection to reactor 120. In certain embodiments, reactor 120 comprises a branched polymeric template, such as polyethyleneimine (PEI). In certain embodiments, the branched polymeric template is highly dispersed within reactor 120. For example, the branched polymeric template may be present in reactor 120 as a high-surface-area powder that is pre-dissolved in an aqueous medium. As another non-limiting example, the branched polymeric template in reactor 120 may be physically mixed with mesoporous silica that provides a high-surface-area substrate to support the growth of metallic nanoparticles in the branched polymeric template. Alternatively, if desired, the branched polymeric template may be premixed with the salt solution before the salt solution is admitted into reactor 120, either by a batch mixing process or by a bringing together in a continuous flow process a flow stream comprising the transition metal ions and a flow stream comprising the branched polymeric template. In the embodiment shown in FIG. 1, reactor 120 is equipped with an optical port 125 that admits ultraviolet light 135 from UV light source 130 into reactor 120. The UV light 135 emanating from UV light source 130 contains radiation at wavelengths suitable for causing the photoreduction of the transition metal ions in the solution from device 110. Thus, when the solution from device 110 is admitted into reactor 120, UV light 135 may be admitted into reactor 120 to cause photoreduction of the transition metal ions in the solution. Apparatus 100 further comprises separation unit 140 which is used to separate the branched polymeric template from the metallic nanoparticles contained therein using, for example, a ligand exchange reaction, diafiltration, or an oxygen plasma. The metallic nanoparticles that are recovered from separation unit 140 may be further purified by purification unit 150, which may comprise different filtering, washing, and drying steps, as needed.

Figure 2:
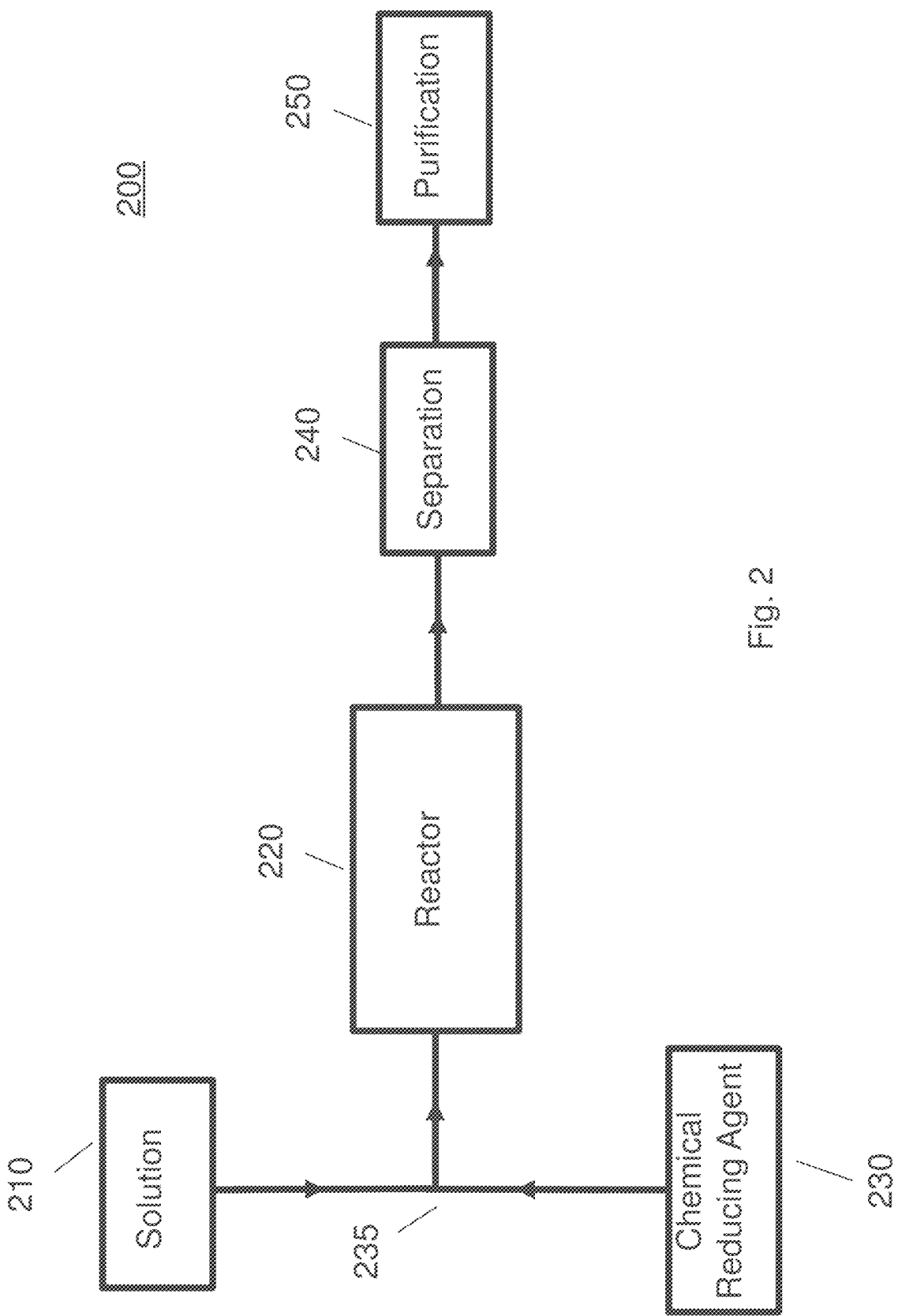
FIG. 2: A schematic illustration of an apparatus for producing metallic nanoparticles according to another embodiment of the invention.

FIG. 2 shows a schematic diagram of an apparatus 200 for producing metallic nanoparticles according to another exemplary implementation of the invention. In FIG. 2, device 210 is fluidly connected to reactor 220. Device 210 contains a salt solution of a transition metal salt and, when needed, delivers the salt solution to reactor 220 via its fluid connection to reactor 220. Similar to the case for reactor 120 in FIG. 1, in certain embodiments, reactor 220 comprises a branched polymeric template, such as polyethyleneimine (PEI). The branched polymeric template (e.g., PEI) is preferably highly dispersed within reactor 220 (e.g., pre-dissolved in an aqueous medium or physically mixed with mesoporous silica that provides a high-surface-area substrate to support the growth of metallic nanoparticles in the branched polymeric template). Alternatively, if desired, the branched polymeric template may be premixed with the salt solution of device 210 before the salt solution is admitted into reactor 220, either by a batch mixing process or by a bringing together in a continuous flow process a flow stream comprising the transition metal ions and a flow stream comprising the branched polymeric template. Apparatus 200 further comprises device 230 which is fluidly connected to reactor 220. Device 230 contains a solution containing a chemical reducing agent (e.g., sodium borohydride) and, when needed, delivers the salt solution to reactor 220 via its fluid connection to reactor 220. In the embodiment shown in FIG. 2, device 210 and device 230 are fluidly connected via junction 235. When the salt solution from device 210 and the chemical reducing agent from device 230 are combined with the branched polymeric template in reactor 220, metal nanoparticles will form within the branched polymeric template as a result of the chemical reduction of the transition metal ions in salt solution from device 210. In certain embodiments, the salt solution and the chemical reducing agent are admitted sequentially into reactor 220. However, if desired, a solution comprising a transition metal salt and a branched polymeric template and a solution comprising the chemical reducing agent can be premixed via junction 235 before they are admitted into reactor 220.

EXAMPLES

Example 1: Synthesis of Metal Nanoparticles in a Branched PEI Template and in a PAMAM Dendrimer Branched polyethyleneimine, $H(NHCH_2CH_2)NH_2$, average $M_w$~25,000 by LS, average $M_n$~10,000 by GPC and generation four (G4) PAMAM dendrimer were purchased from Sigma Aldrich. Copper(II) nitrate hemi(pentahydrate), $Cu(NO_3)_2 \cdot 2.5H_2O$ was used as the metal source. Deionized water was used as the solvent and sodium borohydride ($NaBH_4$) was used as the reducing agent. All chemicals were of analytical reagent grade and purchased from Sigma Aldrich Chemical Company. Stock solutions of polyethyleneimine (PEI) at 0.5 weight percent and 1 weight percent (wt %) and micromolar concentration of dendrimer were prepared. (To form these solutions, PEI was weighed and dissolved in 500 mL of deionized water, and the solution was heated to 50° C. for 30 minutes). A 0.2 M solution of the copper salt was prepared by dissolving 5.815 g of the as-received copper salt into 125 mL of deionized water and used as the Cu metal source.

Using ultraviolet-visible spectroscopy (UV-vis), absorbance spectra were collected for the polyethylenimine metal salt solution and for the complexation of Polyethylenimine-copper solution (PEI-$(Cu^{2+})_x$ before chemical reduction. All absorbance measurements were carried out using a Hewlett-Packard HP 8453 UV-visible spectrophotometer equipped with a 1.0 cm optical path length quartz crystal cuvette. The wavelength range of analysis was 250-800 nm.

X-ray photoelectron spectra (20sw, 59.7eVPE, 0.125eVstep) were collected on a PHI 5600 XPS system equipped with a Mg Kα X-ray (1253.6 eV) source (Physical Electronics, Chanhassen, MN). Powdered black/blue Cu NPs were dusted onto double sided carbon tape, initial photoelectron spectra were collected before and after sputtering with an Ion Gun at $10 \times 10^{-3}$ Pa $Ar^+$ with at a constant current of +0.7 uA. XPS Spectra were measured after 1, 5, 15, 30 and 60 mins of sputtering. XPS (100 sweeps, 59.7 eV pass energy, 0.125 eV/step). 99.99% copper foil, (Strem Chemicals) Ar+ sputtered for 15 min, was utilized as a standard for metallic copper. Similarly, a copper(I) oxide sample, sputtered for one minute to remove Cu(II) oxide that formed at the surface was used as a copper (I) oxide reference.

X-ray diffraction (XRD) measurements were used to determine the crystallographic structure of the Polyethylenimine-coated Cu NPs. X-ray diffraction analyses were carried out using a Rigaku D/MAX 2200 X-ray diffractometer with a diffracted beam graphite monochromator using Cu Kα radiation. Analysis was performed from 0° to 80° of 2θ angle at a rate of 5 degrees per minute and a sample width of 0.02. The data were collected and peaks were analyzed using PDF data base of Joint Committee on Powder Diffraction Standards (JCPDS).

Transmission electron microscopy (TEM) was used to image the Cu NPs produced by the batch process, dendrimer-mediated Cu NPs and the new method of nanoparticle production, fluidic flow PEI-synthesized Cu NPs. Before imaging, Cu NPs were dispersed in Milli-Q water in a one-dram vial (15 mm width×45 mm length) and diluted with Milli-Q water until the color of the resulting dispersion was not apparent looking through the vial but was apparent looking along the length of the vial. Note that the dendrimer-mediated Cu NP solution exhibited a brown/yellow hue and PEI-synthesized Cu NP solution exhibited a blue hue. A 6 µL drop of each suspension was deposited on 200 mesh copper TEM grids with Formvar and carbon supports (Ted Pella Inc., Redding, CA). The grids were allowed to dry in ambient conditions with a protective cover to prevent contamination by dust. Images were collected using a Tecnai T12 transmission electron microscope with an operating voltage of 120 kV at various magnifications. Images were processed in Image J. The line tool was used to determine the diameter of the Cu NPs formed by the dendrimer and PEI processing methods; more than 600 individual nanoparticles were sized in each condition.

Example 2: Synthesis of Dendrimer-Mediated Copper Nanoparticles

A standard chelation and chemical reduction procedure was used. In short, the prepared dendrimer and copper salt solutions were mixed with a 55 mol equivalent of $Cu(NO_3)_2 \cdot 2.5H_2O$ to dendrimer with continuous stirring. Subsequently, a complex solution of dendrimer and metal ions Den-$(Cu^{2+})_X$ where X=55 mole ratio was formed. After 15 minutes of continuous stirring, the addition of 10-fold excess of freshly prepared aqueous reducing agent "$NaBH_4$" was added in a drop-wise manner to the complex solution to produce zero-valent Cu nanoparticles via chemical reduction. All nanoparticle growth experiments were carried out under a $N_2$ atmosphere to prevent oxidation as the Cu nanoparticles formed.

The reactor is composed of multiple modular commercially available components. In this setup, the fluid flow is driven by the peristaltic pump and mixing of each component (salt solutions, reducing agent, and hosting agent—PEI) occurs in the reactor cell. Although our CuO nanoparticles are freeze-dried at the end of the production process to increase shelf-life, the reactor flow diagram above also features an integrated purification system wherein ligand-exchange chemistry can be used as an additional attachment to the reactor system to create a high-throughput approach for nanoparticle purification.

Figure 3:
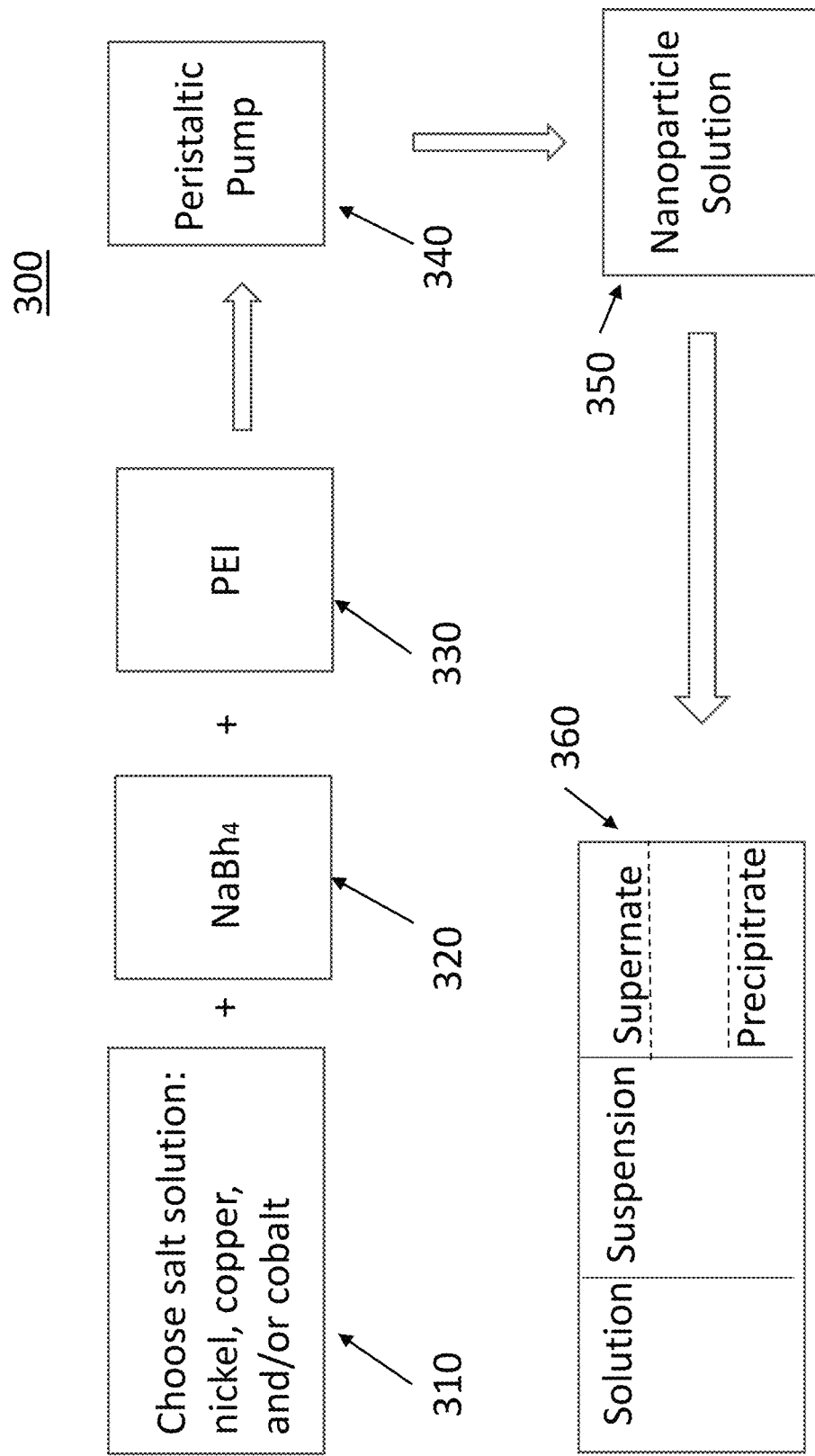
FIG. 3: A schematic diagram of an exemplary flow reactor set-up for synthesizing copper nanoparticles using polyethyleneimine as a branched polymeric template.

FIG. 3 shows a highly schematic diagram of an apparatus 300 that was used for producing metallic nanoparticles in accordance with one exemplary embodiment of the invention. In FIG. 3, apparatus 300 is a flow reactor that included first device 310 that was configured to deliver salt solutions of nickel, copper, and/or cobalt. Apparatus 300 further comprised a second device 320, which was configured to deliver a chemical reducing agent (here, sodium borohydride $NaBH_4$). Apparatus 300 further comprised device 330, which was configured to deliver polyethyeleneimine (PEI), a branched polymeric template. The salt solution(s), chemical reducing agent, and PEI were combined via peristaltic pump 340 to produce metallic nanoparticle solution 350. The peristaltic pump 340 was capable of mixing several solutions via a t-mixer setup during the nanoparticle formation process. In this example, the peristaltic pump 340 was a Thomas 3386 Mini Variable Speed Tubing Pump with a 0.4 to 85 mL/min flowrate control range. Polyvinyl tubing with a 6.35 mm internal diameter and a t-mixer with an internal diameter of 4.32 mm were used to transport and mix both the $PEI-(Cu^{2+})_x$ solution and reducing agent in concert and, subsequently, the solution was collected into the flow reactor cell. The flow rate was controlled to manipulate the residence time of the premixed $PEI-(Cu^{2+})_x$ solution and reducing agent flowing through the reaction tubing. During particle formation, residence times of 3-10 minutes from the point of mixing to the point of entering the reactor cell resulted in substantially uniform Cu nanoparticles. From this example, it was observed that when the $PEI-(Cu^{2+})_x$ solutions were premixed in this flow reactor the required residence time to produce nanoparticles was significantly reduced.

The reactor may be composed of multiple modular commercially available components. In this setup, the fluid flow can be driven by the peristaltic pump and mixing of each component (salt solutions, reducing agent, and hosting agent—PEI) occurs in the reactor cell. Although CuO nanoparticles can be freeze-dried at the end of the production process to increase shelf-life, the reactor flow diagram above also features an integrated purification system wherein ligand-exchange chemistry can be used as an additional attachment to the reactor system to create a high-throughput approach for nanoparticle purification.

Example 3: Gram-Scale Synthesis of PEI-Coated Cu Nanoparticles

Figure 4:
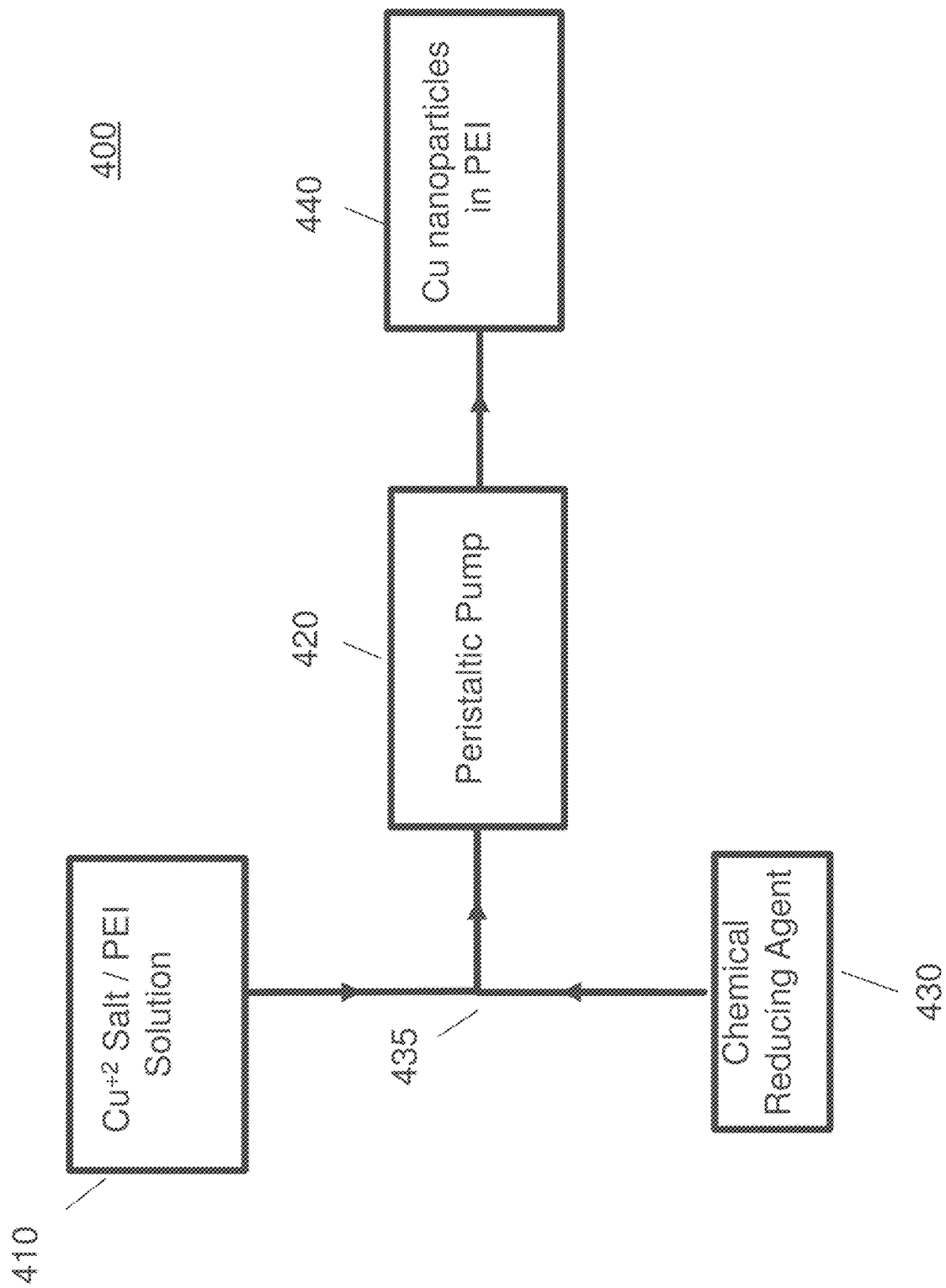
FIG. 4: A schematic diagram of another exemplary flow reactor set-up for synthesizing copper nanoparticles using polyethyeleneimine (PEI) as a branched polymeric template.

Gram-scale synthesis of PEI-coated Cu nanoparticles was accomplished using apparatus 400 shown schematically in FIG. 4. Broadly speaking, apparatus 400 comprised device 410 which was configured to combine a pre-mixed solution of a $Cu^{+2}$ salt and PEI with a chemical reducing agent 430 via T-mixer 435. The mixture was pumped via peristaltic pump 420 to produce Cu nanoparticles coated with PEI, which was recovered in container 440. The polyethyleneimine (concentration 0.5 wt % to 1 wt %) was purchased and used as the stabilizer and capping agents and as the ion-pair exchanged medium (branched polymeric template). Micromolar concentrations (between 1 mM to 20. mM) of the copper salt solutions were prepared and mixed with the 0.5 wt % to 1.0 wt % PEI solution to promote formation of a complex of polyethyleneimine and metal ions $(PEI-(Cu^{2+})_x$ where X=0.5 or 1 wt %). Under pumping conditions to provide a flow rate of 20 mL/min, the chemical reducing agent (freshly prepared 1.0 M $NaBH_4$ reducing agent) and the complexed $PEI-(Cu^{2+})_x$ solutions were added to the reaction cell at a constant rate of flow via T-mixer 435 as shown in FIG. 4. A flow rate of 20.0 (or in certain cases a flow rate of 23.0) mL/min was empirically determined to achieve optimal Cu nanoparticle monodispersity in this reactor. To enhance the lifetime of the stable PEI-coated Cu nanoparticles, the Cu nanoparticles were freeze-dried and stored in test tubes at temperatures below −25° C. to minimize aggregation caused by the nanoparticle-to-nanoparticle interactions that initiate aggregation in batch reactor processes. The yield of Cu nanoparticles made in accordance with these procedures was >90%.

Mass measurements were conducted to determine the total amount of nanoparticles produced at the end of the flow-reactor runtime. Based on these mass measurements made after freeze-drying of the resulting PEI-encapsulated copper oxide nanoparticles, gram-scale synthesis of CuO nanoparticles can be achieved through continuous flow mixing of the complex solution and reducing agent at micro- and nanomolar concentrations or by increasing the concentration to millimolar to reduce the amount solution needed and reaction runtime. Since PEI is used to stabilize the Cu nanoparticles as they are synthesized, higher concentrated precursor solutions (ca. 0.20 mM) can be used to produce gram-scale Cu nanoparticle without the occurrence of NP aggregation due to the mitigation of metal-to-metal attraction. That is, increasing the concentration of the precursor solution does not lead to aggregation of the formed copper oxide nanoparticles. In the lower concentration cases, 1000.00 mL of $PEI-(Cu^{2+})$ at 0.5 wt % or 1.0 wt % is mixed with equal volumes of reducing agent and flowed at a rate of 23 mL/min with an in-residence runtime of 50 minutes. Similar conditions are used at higher concentrations (>1M), however, in this case, only 125 mL of the $PEI-(Cu^{2+})$ solution mixed with an approximate total in residence time of 6 minutes.

Based on the foregoing results and on extrapolating calculations using absorbance spectroscopy and Beers Law, the invention recognizes that gram-scale synthesis of Cu nanoparticles can be achieved through continuous flow mixing of the complex solution and reducing agent at micro- and nanomolar concentrations or by increasing the concentration to millimolar to reduce the amount solution needed and reaction runtime. In particular, since PEI is used to stabilize the Cu nanoparticles as they are synthesized, super-concentrated precursor solutions (ca. 0.20 mM) can be used to produce gram-scale Cu nanoparticle without the occurrence of aggregation due to the direct interruption of the metal-to-metal attraction.

In addition, the invention recognizes that when dilute solutions are used, Cu nanoparticles may be formed by increasing the residence time. Thus, in certain embodiments, the residence time is about 45, 50, 55, 60, 65, 70, 75, or even 90 minutes. When using more concentrated solutions (about 1 mM to 200 mM), only 125 mL of the $PEI-(Cu^{2+})$ solution needs to be mixed with the chemical reducing agent, and the approximate total in residence time is only 6 minutes. Thus, using more concentrated salt solutions can result in faster metallic nanoparticle formation.

Figure 5A:
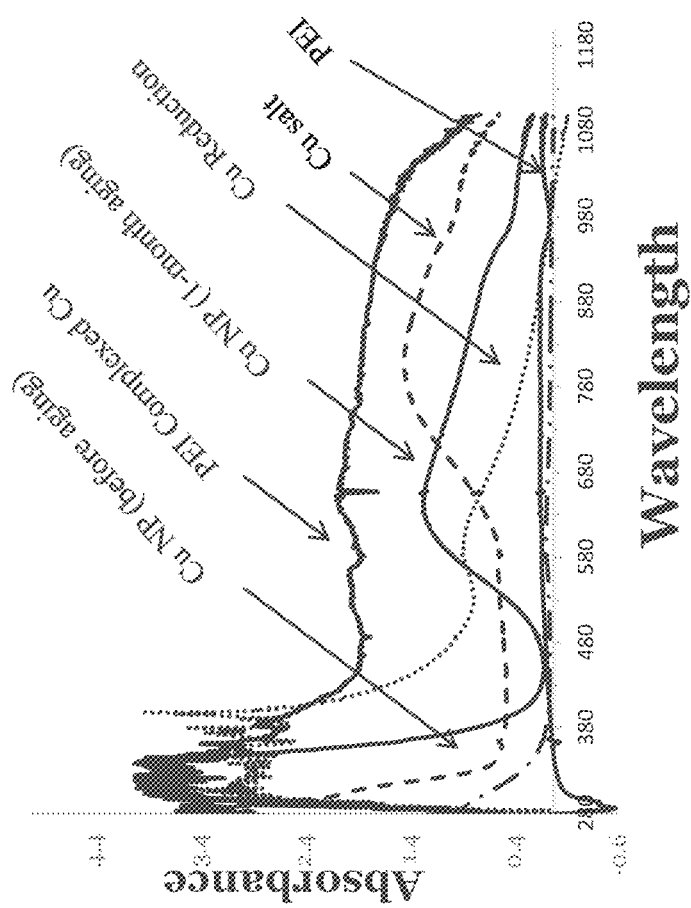
FIG. 5A: UV-vis spectra of copper nanoparticles in PEI during synthesis and after aging for one month.

Example 4: UV-Visible and X-Ray Photoelectron Spectroscopic Characterization of Flow Reactor-Synthesized Cu Nanoparticles Copper and copper oxide nanoparticles exhibit UV-vis absorbance peaks at around 590 nm and 390 nm, respectively. FIG. 5A provides UV-vis spectra taken under ambient atmospheric conditions during the formation of the Cu nanoparticles and one month after the Cu nanoparticles were formed in accordance with Example 1. In each case, the spectra were recorded with the Cu nanoparticles in an aqueous solution. The UV-vis spectra reveal information pertaining to the process by which the Cu nanoparticles are formed and their stability upon reduction to aggregation; these data suggest minimal aggregation over the timescale of one month. As can be observed, under the chelation and chemical reduction method, once the PEI-$(Cu^{+2})_x$ has been reduced, copper nanoparticles are formed. The initial reduction absorbance spectrum shows a broad, low intensity localized surface plasmon resonance (LSPR) peak at approximately 598 nm which is indicative of the formation of Cu nanoparticles with no native oxide layer (FIG. 5A). Typically, Cu nanoparticles with diameters around 4 nm exhibit strong broadening of the plasmon band. Furthermore, as more Cu nanoparticles are formed, the UV-vis absorbance peak observed at around 598 nm typically increases in intensity. This is the direct result of more copper nanoparticles being formed as the flow reaction continues. The absence of any peaks at 390 nm for UV-vis measurement taken at the initial and final stages of the flow process indicates that no native oxide layer was formed. This shows that gram-scale Cu nanoparticles have been synthesized without any modification of surface characteristics due to oxidation.

Figure 5B:
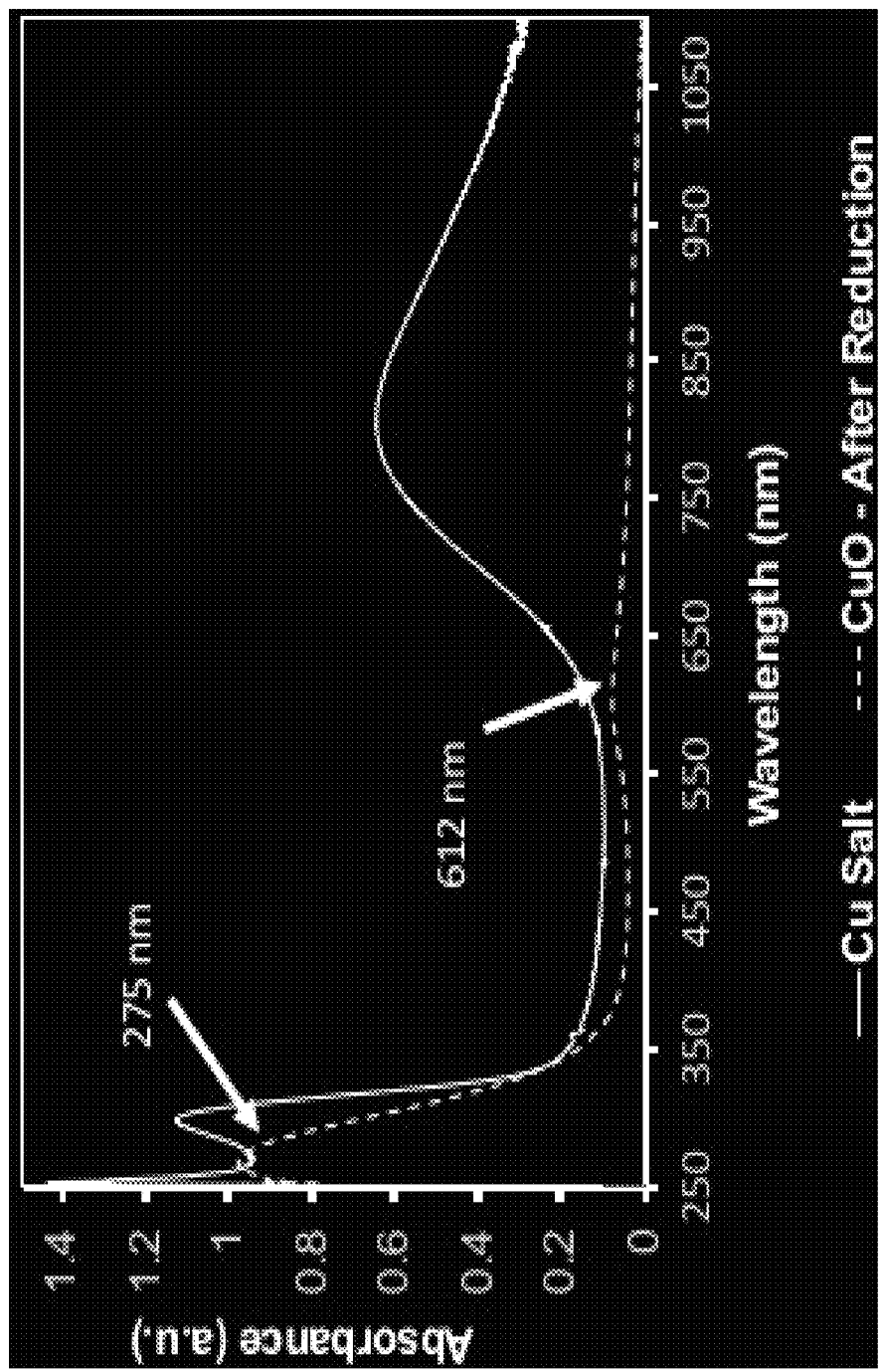
FIG. 5B: Typical UV-vis spectra revealing the extinction spectra for the copper salt ($Cu(NO_3)_2 \cdot 2.5H_2O$) and copper oxide nanoparticles formed after the reduction process has occurred under flow reactor conditions.

FIG. 5B shows UV-Vis spectra pertaining to the process by which the Cu nanoparticles are formed. In this figure, a spectrum of the copper salt and of the reduced copper nanoparticles were analyzed to determine if Cu or CuO nanoparticles are being formed. As can be observed, under the chelation and chemical reduction method, once the PEI-(Cu2+)x has been reduced, copper oxide nanoparticles are formed. The initial absorbance of the copper salt (ca. 808 nm) shifts dramatically after chelation with the amines of the PEI and subsequent reduction via sodium borohydride. That is, the extinction spectrum shows a broad, low intensity peak at approximately 608 nm and another peak at 275 nm that is indicative of the formation of CuxO (i.e., Cu2O and CuO) NPs.

Figure 6B:
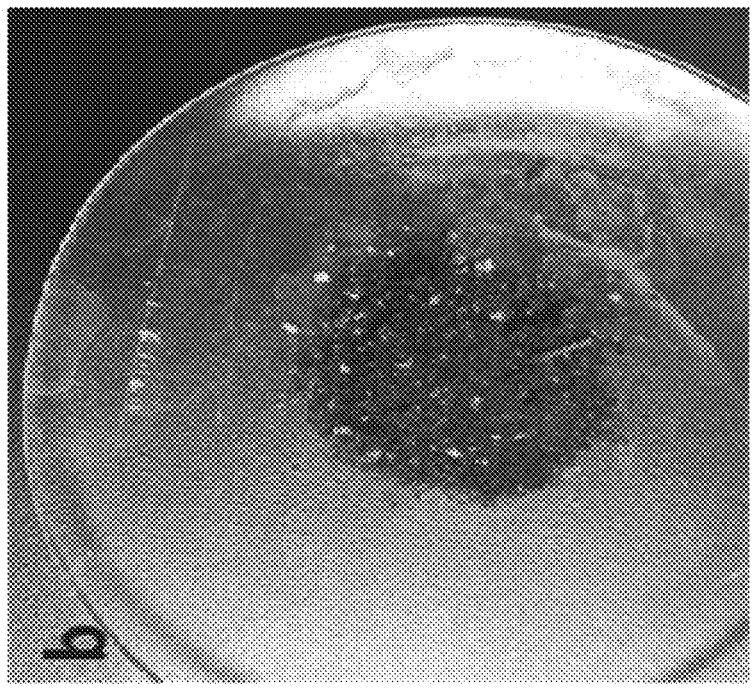
FIG. 6B: photograph of copper nanoparticles taken after one month of aging.
Figure 6A:
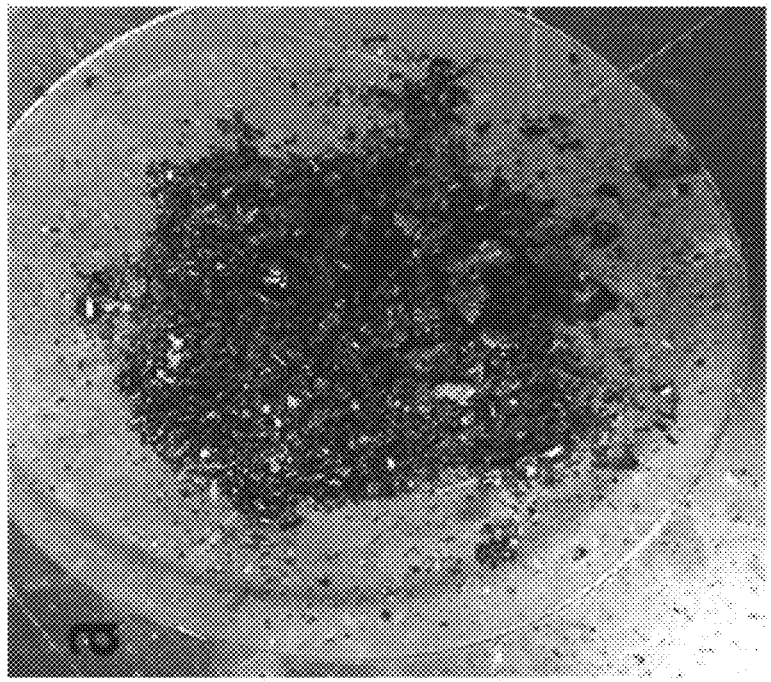
FIG. 6A: a photograph of copper nanoparticles taken immediately after freeze-drying.

Aging studies were performed to determine the stability of the PEI-coated Cu nanoparticles. After storing the Cu nanoparticles for one month in an aqueous suspension, a slight shift in the LSPR to longer wavelengths (ca. 641 nm) was observed, indicating that the PEI-coated Cu nanoparticles had begun to oxidize. This was further verified by a visual observation of the one-month-old Cu nanoparticle freeze-dried powder, which showed a slight blue tint indicating the presence of oxidized Cu nanoparticles. (See FIG. 6). The oxidation was expected since the PEI-coated nanoparticles were stored in water under normal atmospheric conditions during the freeze-drying process. FIGS. 6A and 6B show photographs of the PEI-coated CuO NPs immediately after freeze-drying (FIG. 6A) and after exposure to ambient conditions for one month (FIG. 6B). Apparently, macroscale physical changes of the freshly prepared PEI-coated CuO NP powder are observed when compared to its 1-month aged counterpart. As can be observed, obvious color and texture changes are evident in the aged sample. To determine the exact impact of this change on the physical and chemical state of the PEI-coagted CuO NPs, further investigations were conducted using XPS and XRD.

Figure 7A:
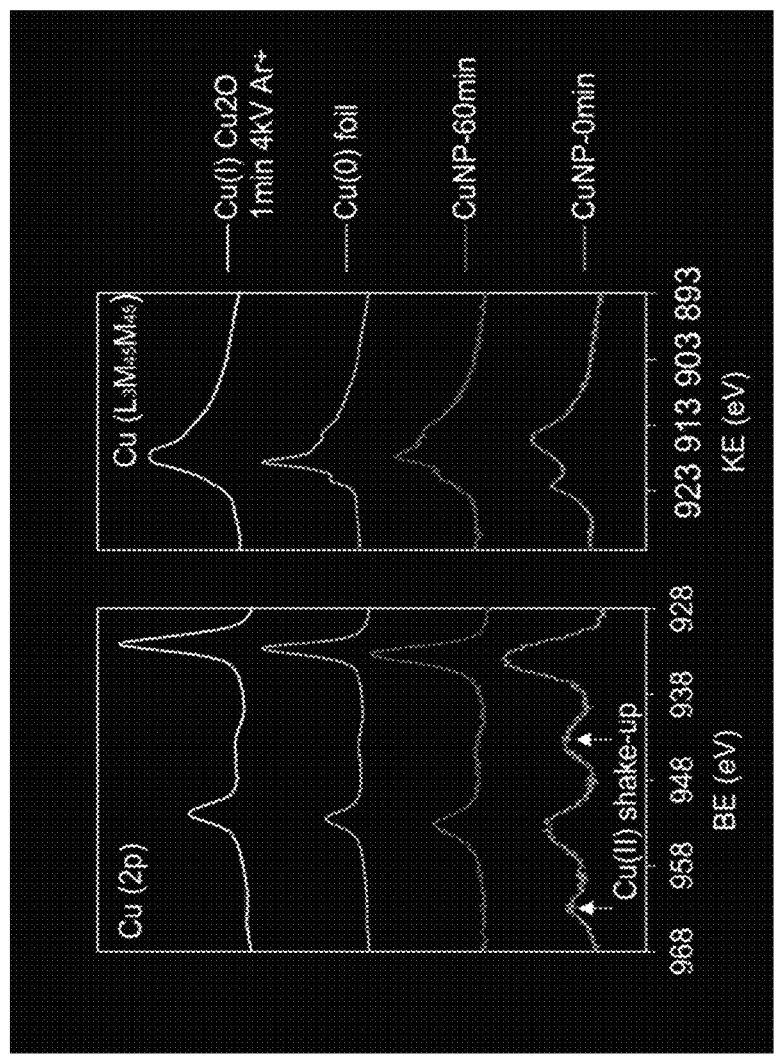
FIG. 7A: Cu(2p) XPS and Cu($L_3M_{45}M_{45}$) Auger transitions observed for different Cu-containing samples. From bottom to top; the as-received CuNPs; the CuNPs after argon sputtering (60 minutes at $10 \times 10^{-3}$ Pa, 4 kV); a Cu metal foil standard; a copper(I) oxide standard sputtered for 1 min to remove Cu(II) species ($10 \times 10^{-3}$ Pa, 4 kV). Sputtering studies of the copper nanoparticles, taken as a function of sputtering time and compared with a copper (0) foil. Left panel: Cu 2p XPS spectra; Right panel: Cu ($L_3M_{45}M_{45}$) Auger electron spectra.
Figure 7B:
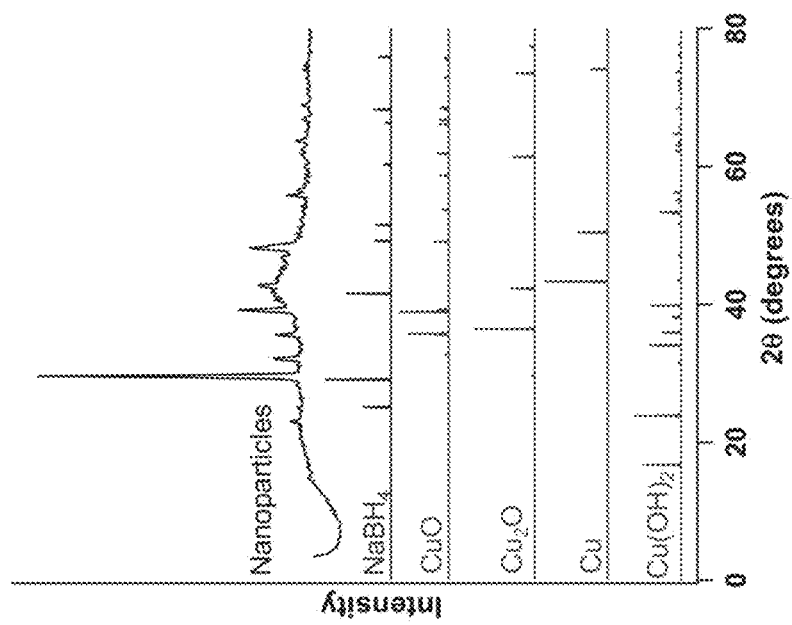
FIG. 7B: XRD of PEI-coated copper oxide nanoparticles and simulated $Cu(OH)_2$, $NaBH_4$, Cu metal and different forms of simulated copper oxides (CuO and $Cu_2O$).
Figure 8:
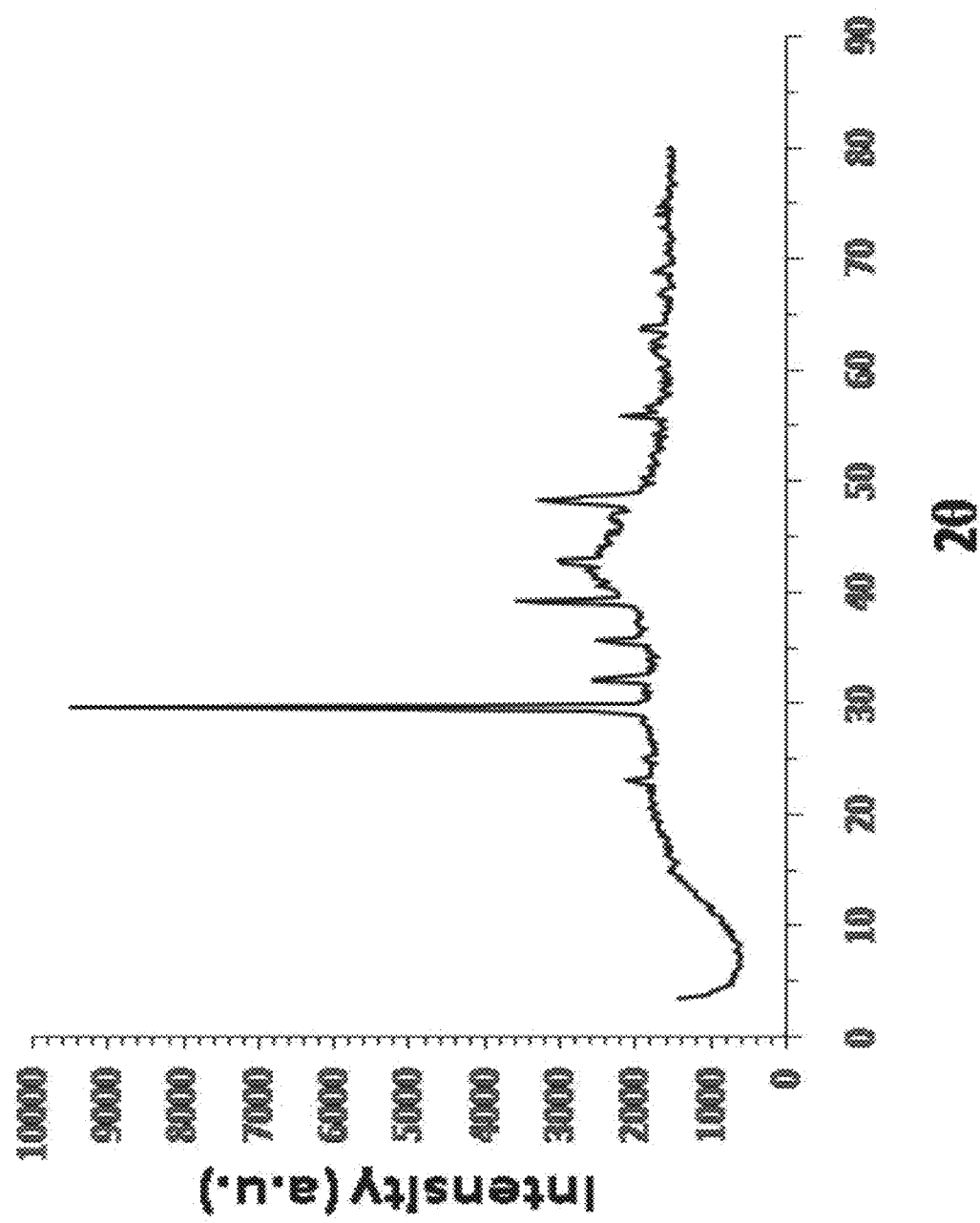
FIG. 8: X-ray diffraction pattern of copper nanoparticles prepared in accordance with the methods of the invention.

X-ray photoelectron spectroscopy (XPS) studies were performed to confirm that the nanoreactor-synthesized Cu nanoparticles gradually oxidize upon exposure to ambient conditions. XPS analysis of the Cu nanoparticles (prepared in accordance with Example 1) revealed the presence of significant concentrations of boron (11%), carbon (35%), nitrogen, oxygen (38%), and sodium (3%) with only a small (1%) Cu concentration. The boron and sodium can be ascribed to residual $NaBH_4$ used in the nanoparticle synthesis while the carbon, nitrogen, and most of the oxygen are a reflection of the PEI polymer adsorbed onto the copper nanoparticle surface. A detailed scan of the Cu 2p region (lower left hand spectra in FIG. 7A) showed the presence of Cu(II) species, as evidenced by the presence of shake-up peaks at ≈9 eV higher than the principal Cu $2p^{1/2}$ and $2p^{3/2}$ peaks. After 60 minutes of argon ion sputtering, however, the Cu(II) shake-up peaks had diminished and the Cu(2p) and Cu $(L_3M_{45}M_{45})$ auger line shape had changed to resemble those of metallic copper foil (compare the Cu(2p) and Cu($L_3M_{45}M_{45}$) regions in the upper two spectra in FIG. 7A. Thus, the XPS data are consistent with copper metal nanoparticles having a thin copper oxide shell at the surface and a copper metal core. Moreover, a comparison of the Cu(2p) and Cu($L_3M_{45}M_{45}$) Auger transitions with those observed from a sputter cleaned Cu(0) metal foil and a Cu(I) oxide reference (uppermost two sets of spectra in FIG. 7A) indicates that the surface of the Cu NPs is composed exclusively of Cu(II)O. Upon sputtering the Cu NPs, the signals associated with the organic and inorganic species (C, N, O and B) greatly decreased and the intensity of the elemental Cu peaks correspondingly increased. FIG. 7B shows that argon sputtering produced significant changes in the Cu(2p) and Cu ($L_3M_{45}M_{45}$) auger line shapes. Unfortunately, Cu(II)O is known to be extremely susceptible to ion beam induced reduction, compromising the ability of $Ar^+$ sputtering to provide unambiguous diagnostic information on the depth dependent composition of copper oxides. However, since the surface of these Cu NPs represents a large fraction of the material, the XPS data indicates that the majority of the copper atoms are present as Cu(II)O.

FIG. 7B provides XRD data of PEI-coated copper oxide nanoparticles and simulated $Cu(OH)_2$, $NaBH_4$, Cu metal and different forms of simulated copper oxides (CuO and $Cu_2O$). Note that the peak matches from the simulated XRD spectra indicates that both CuO and $Cu_2O$ are formed upon reduction of the PEI-$Cu^{+2}$ complex. The slight mismatch in peak position for some of simulated data when compared to the experimental data is insignificant and can be attributed to a mismatch in the exact simulation settings (e.g., temperature).

Example 5: XRD and TEM Characterization of Flow Reactor-Synthesized Cu Nanoparticles XRD and TEM analyses were performed to determine the crystal structure, size, and shape of the PEI-coated copper oxide NPs produced using the flow reactor. FIG. 7B shows the typical XRD pattern for the PEI-coated copper oxide NPs along with simulated XRD spectra for several relevant possible products; these simulated patterns were made using CrystalDiffract software based on structural parameters from the Crystallography Open Database. It is well-documented in the literature that XRD peaks observed at diffraction angles (2θ) of 43.6°, 50.8°, and 74.4° correspond to (111), (200), (220) reflections of elemental Cu(0) in a face-centered cubic structure. These peaks are not observed in our XRD spectrum. However, the simulations using Crystal-Diffract confirm the UV-vis and XPS data showing that copper oxide is formed after the reduction of the PEI-$Cu^{+2}$ complex with sodium borohydride. The presence of $Cu_2O$ is confirmed by the observance of XRD peaks at 29.68, 42.6° and 61.76° 2" and corresponds to (110), (200), (220), and (311) diffraction planes, respectively, and the presence of CuO is confirmed by the observance of XRD peaks at 32.5°, 35.5°, 38.7°, 48.7°, 63.4°, and 66.2° corresponding to (110), (002), (111), (202), (113), and (311) diffraction planes, respectively. As can be observed in FIG.

9, the simulated spectra for $Cu_2O$ and CuO show XRD peak positions that match well with the expected XRD peak positions in our experimental XRD spectrum. That is, the simulated XRD patterns for both copper oxides correspond well with the pattern shown for the experimental data presented in FIG. 7B. Furthermore, this supports the XPS observations that the majority of the copper nanoparticles is present as CuO when grown in our system and freeze-dried. The peak at around 26.6° 2" can be attributed to the silicon substrate used to hold the sample during the XRD analysis. Thus, we conclude that Cu NPs grown in our system are primarily in the oxidized ($Cu_2O$ and CuO) form.

XRD and XPS measurements of PEI-coated copper oxide NPs that were stored for 1 month in aqueous suspension show similar results for copper oxide formation.

Figure 9:
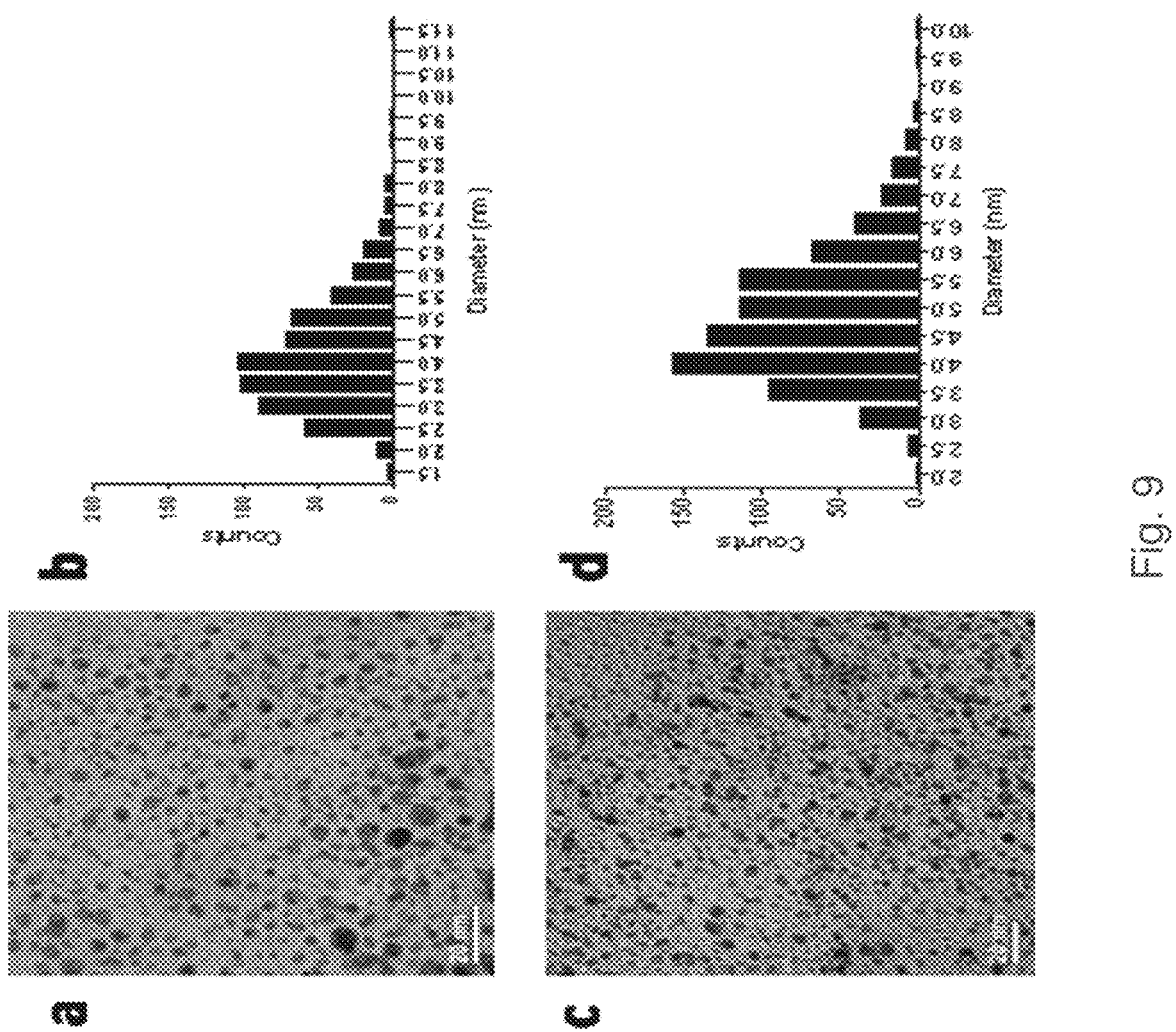
FIG. 9.

A represented TEM micrograph of the Cu nanoparticles produced under dendrimer-encapsulation templating is shown in FIG. 9A and its corresponding particle size histogram in FIG. 9B. The size of Cu NPs reported here exceed the typical average size (ca. 1.8 nm) that has been reported in the literature when $Cu^{2+}$ ions are chelated using a OH terminated, fourth-generation (G4) dendrimer and chemically reduced using excess $NaBH_4$. A G4 dendrimer has an internal diameter around 4.5 nm which limits the overall average size of the Cu NP that forms within the protected cavity. Hence, in this case, observance of Cu nanoparticles with average sizes that exceeds the diameter reported for an OH terminated dendrimer is inconceivable based on the physical approach used to explain the Cu nanoparticle formation process reported by Crooks and coworkers. Nanoparticles formed on this scale with a generation 4 dendrimer is often reported with the amine ($NH_2$) terminated dendrimer structure where the pH has been controlled (pH>3.5) to initiate growth on the peripheral via protonation of the external amine groups. In this case, instead of formation of dendrimer-encapsulated Cu (intra-dendrimer) nanoparticles, nanoparticles bind at the terminal amines of the dendrimer structure and are stabilized by the dendrimer-to-dendrimer interactions (inter-dendrimer). This explanation is ruled out in this case since OH terminated dendrimers are used to conduct this study. One other viable solution is that there is a competing reaction taken place yielding two sets of nanoparticle size regimes. Crook et al. reported that when using the OH terminated dendrimer $Cu^{2+}$ ions are present both inside the dendrimer and as hydrated ions in solution when excess sodium borohydride is used as the reducing agent. After reduction, it is reported that these excess $Cu^{2+}$ ions form dark precipitates with 9±4 nm in average diameter. Thus, in this case, the larger sized nanoparticles formed due to the excess $Cu^{2+}$ ions available in the solution have skewed the overall average deduced from the TEM images.

A representative TEM micrograph of the PEI-coated copper nanoparticles is shown in FIG. 9C. This TEM micrograph, along with the corresponding size distribution profiles provided in FIG. 9D, show that the Cu nanoparticles produced under the flow reactor conditions of Example 1 exhibit high uniformity in their shape and size. The prominent shape observed here is spherical in nature with an average diameter of 4.8±1.4 nm. See FIG. 9D. The diameter of the nanoparticles are further confirmed by using the Debye-Scherer equation when based on the FWHM of the (111) XRD reflection plane revealed an estimated average particle size of 5 nm that is in good agreement with the observed average size as revealed by TEM imaging. Hence, the XRD and TEM analyses indicate that PEI-stabilization within the flow reactor facilitates production of single-phased (fcc phase only), zero-valent Cu nanoparticles with spherical geometries and diameters as small as 3.4 nm during the reaction process. However, it is noted that since these nanoparticles are synthesized in ambient conditions, the oxidation of the formed Cu particles occur in less than a month.

Example 6: Comparative Example with Dendrimer Template

The chemical reduction method using the PEI-mediated synthesis approach can be used to scale up copper oxide NP production to the gram scale without sacrificing NP quality. Thus, we compared CuO particles produced using the reactor to those produced by traditional dendrimer-based synthesis (Table I). More specifically, in this section, we provide a comparison of the Cu nanoparticles produced by both methods to demonstrate the effectiveness of the flow system in producing similar well-defined, spherical shaped CuO NPs with scaled up quantities. This example compares the copper nanoparticles synthesized using a PEI template in accordance with the invention with copper nanoparticles formed using a conventional PAMAM G4 dendrimer. Table 1 provides a comparison of certain properties of the Cu nanoparticles produced in accordance with the invention with the properties of copper nanoparticles produced by using a conventional PAMAM G4 dendrimer.

TABLE 1

Tabulated data comparing Cu NPs synthesized using the flow reactor and dendrimer-mediated process.

| Source | PAMAM Dendrimer | Polyethylenimine, PEI |
| --- | --- | --- |
| Structure Type | Branch (G4) | Branch |
| Particle Diameter | 4.13 ± 1.26 nm | 4.80 ± 1.14 nm |
| Geometry | Spherical | Spherical |
| Crystal Phase | FCC | FCC |
| Stability (aggregation prevention) | 150 days | >150 days |
| Scalability | No | Yes |

Figure 10:
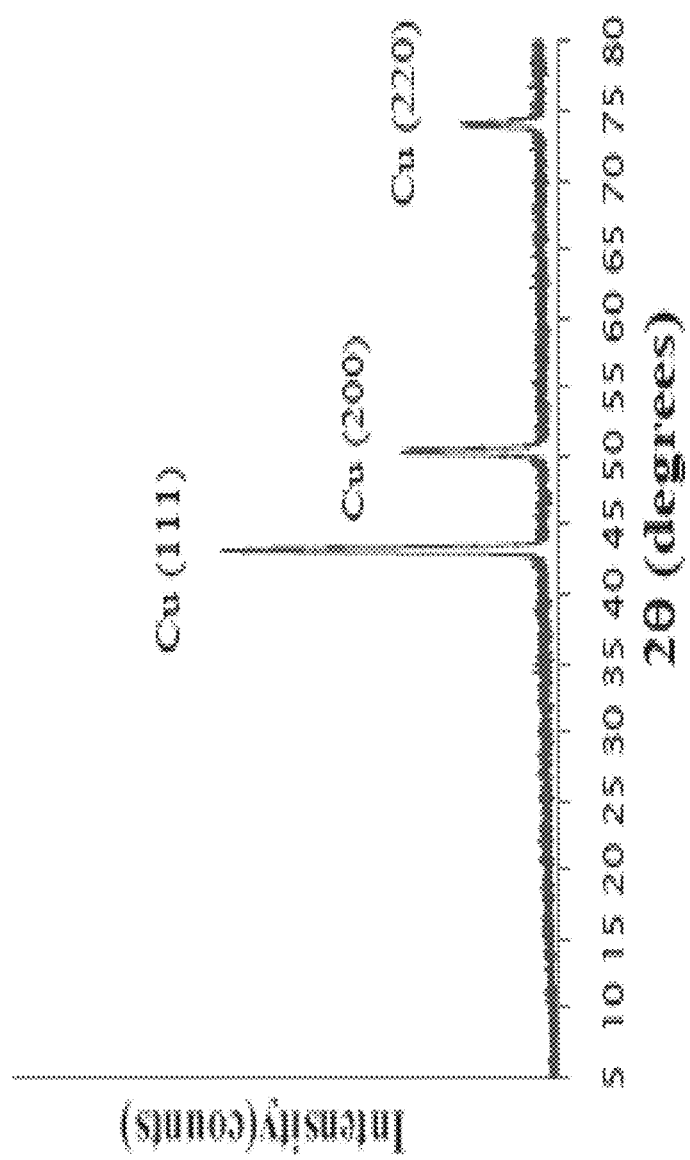
FIG. 10: XRD of Dendrimer-encapsulated zero-valent copper synthesis via the chemical reduction method.

FIGS. 9(a) and 9(c) are plan view TEM images of copper nanoparticles produced by conventional PAMAM-mediated synthesis (FIG. 9(a)) and by using PEI as a branched polymer template in accordance with the invention (FIG. 9(c)). Both methods produced copper nanoparticles with small average diameters, as indicated by the corresponding size distribution profiles (see FIG. 9(b), corresponding to the PAMAM-mediated synthesis and FIG. 9(d), corresponding to the PEI-mediated synthesis according to the invention). In addition, the TEM micrographs show that in both cases, the copper nanoparticles have spherical geometries. In the case of traditional synthesis with the PAMAM dendrimer, the Cu ions were coordinated with the internal tertiary amine groups and are subsequently reduced as zero valent CU (see FIG. 10) in the internal cavities of the dendrimer, providing control over the particle size as aggregation is prevented by dendrimer encapsulation. That is, the metal-to-metal affinity that leads to nanoparticle aggregation was mitigated by the physical entrapment of the nanoparticles inside the cavity structure of the dendrimer once chemically reduced. Since the dendrimer controls nanoparticle aggregation using cavity entrapment, direct control of the particle size was achieved by controlling of the ratio of dendrimer-to-Cu salt and the characteristics of the dendrimer template. In addition, as confirmed in our earlier literature reports on the oxidation of dendrimer-encapsulated Ni(0) NPs, the dendrimer only protects the encapsulated NP from surface oxidation for less than 24 hours. That is, the number of reduced Cu atoms that makeup one copper nanoparticle was directly controlled through the dendrimer-to-Cu salt ratio. Furthermore, higher generations of the PAMAM dendrimer experience overcrowding at the periphery due to interdigitation of the branching units that provides an increased number of possible internal coordination sites for the $Cu^{+2}$ ions to form an ion-pair exchange. This drawback limits the use of higher generation dendrimers to scale up the production of Cu nanoparticles to the gram scale due to the lack of necessary internal amido group ability to coordinate with available $Cu^{+2}$ atoms. Being more specific, the overcrowding at the periphery of the dendrimer directly inhibits the penetration of $Cu^{+2}$ ions, therefore, limiting the scalability of the Cu nanoparticles using this dendrimer-mediated method. In addition, earlier literature reports on the oxidation of dendrimer-encapsulated Ni(0) nanoparticles showed that the dendrimer only protects the encapsulated nanoparticles from oxidation for less than 24 hours.

Unlike the batch process used in the dendrimer-mediated method of synthesizing copper nanoparticles, the flow reactor method described herein allowed the complexed PEI-$(Cu^{+2})_x$ solution to react with a chemical reducing agent in a dynamic environment. The present method is advantageous because it allows for direct control over the amount of reducing agent being exposed to the complex solution and, thus, providing some level of control over the rate of nucleation of the Cu nanoparticles and host molecule coating process. With introduction of the PEI branched polymeric template, the Cu nanoparticles produced in this flow reactor exhibited stability against aggregation for longer time periods when compared to the dendrimer-encapsulated Cu NPs, see Table I. Furthermore, the combination of the coating process and introduced flow mixing of the reducing agent allowed for scalability of the as-synthesized Cu nanoparticle to gram amounts without any significant aggregation.

From the foregoing description, one of ordinary skill in the art can easily ascertain the essential characteristics of the instant invention, and without departing from the spirit and scope thereof, can make various changes and/or modifications of the invention to adapt it to various usages and conditions. As such, these changes and/or modifications are properly, equitably and intended to be, within the full range of equivalence of the following claims.

What is claimed is:

1. A method of synthesizing metallic nanoparticles, the method comprising:
   dispersing, in a reactor, a branched polymeric template mixed with mesoporous silica that provides a surface-area substrate to support growth of metallic nanoparticles of a transition metal within the branched polymeric template, wherein the branched polymeric template is not a dendrimer;
   providing to the reactor a first flow stream comprising an aqueous metal salt solution comprising ions of a transition metal;
   providing to the reactor a second flow stream comprising a chemical reducing agent to reduce the ions of the transition metal to form metallic nanoparticles within the branched polymeric template;
   reducing in the reactor the ions of the transition metal ions in the metal salt solution; and
   separating the metallic nanoparticles from the branched polymeric template using a purification method selected from the group consisting of a ligand exchange reaction, diafiltration, or oxygen plasma.

2. The method according to claim 1, wherein the branched polymeric template comprises a branched polymer selected from the group consisting of polyalkyleneimine, polyester, polyether, thioester, and polysulfide polymers.

3. The method according to claim 2, wherein the branched polymeric template is a polyalkyleneimine.

4. The method of claim 3, wherein the branched polyalkyleneimine is polyethyleneimine.

5. The method according to claim 1, wherein the aqueous salt solution is prepared by dissolving at least one transition metal halide, nitrate, sulfate, or phosphate in water.

6. The method according to claim 1, wherein the nanoparticles comprise one or more metals selected from the group consisting of iron, cobalt, rhodium, iridium, nickel, palladium, platinum; copper, silver, gold, zirconium, and titanium.

7. The method according to claim 1, wherein the branched polymeric template promotes chelation of the transition metal ions by the heteroatoms in the branched polymeric template.

8. The method according to claim 1, wherein the first flow stream and the second flow stream comprising the chemical reducing agent are provided sequentially to the reactor.

9. The method according to claim 8, wherein the chemical reducing agent is selected from the group consisting of sodium borohydride, lithium aluminum hydride, and lithium triethylborohydride.

10. The method according to claim 1, wherein the metallic nano tides have a median diameter in the range of 1 to 10 nm.

11. The method according to claim 3, wherein the step of separating the metallic nanoparticles from the branched polyalkyleneimine template comprises a ligand exchange reaction that liberates the metallic nanoparticles from the branched polyalkyleneimine template.

12. The method according to claim 1, wherein the step of separating the metallic nanoparticles using a purification method consists of the ligand exchange reaction that comprises exposing the metallic nanoparticles in the branched polyalkyleneimine template to an alkanethiol.

13. The method according to claim 1, wherein:
   the providing to the reactor a first flow stream includes:
      providing to the reactor a series of aqueous metal salt solutions, each comprising a different type of transition metal ions; and
   the method further comprising:
      sequentially exposing the branched polymeric templates to each aqueous metal salt solution of the series of salt solutions; and
      forming concentric layers of metallic nanoparticles of the different type of transition metal ions,
      wherein the reducing in the reactor the ions of the transition metal ions includes:
         reducing of the ions of the transition metal in a respective aqueous metal salt solution before exposing the branched polymeric templates to a next aqueous metal salt solution of the series of aqueous metal salt solutions.

14. A method of synthesizing metallic nanoparticles, the method comprising
   dispersing, in a reactor, a branched polymeric template mixed with mesoporous silica that provides a surface-area substrate to support growth of metallic nanoparticles of a transition metal in the branched polymeric template, wherein the branched polymeric template is not a dendrimer;

providing to the reactor a first flow stream comprising an aqueous metal salt solution comprising ions of the transition metal;

admitting ultraviolet (UV) light through an optical port of the reactor to cause photoreduction of the transition metal ions in the metal salt solution;

reducing in the reactor the ions of the transition metal ions in the metal salt solution using the UV light; and separating the metallic nanoparticles from the branched polymeric template using a purification method comprising a ligand exchange reaction.

15. The method according to claim 14, wherein the nanoparticles comprise copper.

16. The method according to claim 14, wherein the ultraviolet light has a wavelength of 254 nm.

17. The method according to claim 14, wherein the branched polymeric template comprises a branched polymer selected from the group consisting of polyalkyleneimine, polyester, polyether, thioester, and polysulfide polymers.

18. The method according to claim 14, wherein the separating the metallic nanoparticles from the branched polymeric template using the purification method comprising the ligand exchange reaction comprises:

liberating the metallic nanoparticles from the branched polymeric template by exposing the metallic nanoparticles in the branched polymeric template to dodecanethiol.

19. The method according to claim 14, wherein the branched polymeric template promotes chelation of the transition metal ions by the heteroatoms in the branched polymeric template.

* * * * *

UNITED STATES PATENT AND TRADEMARK OFFICE
CERTIFICATE OF CORRECTION

| | | |
|---|---|---|
| PATENT NO. | : 11,878,914 B2 | Page 1 of 1 |
| APPLICATION NO. | : 17/175137 | |
| DATED | : January 23, 2024 | |
| INVENTOR(S) | : Michael L. Curry, Aiesha L. Ethridge and Demetrius Finley | |

It is certified that error appears in the above-identified patent and that said Letters Patent is hereby corrected as shown below:

In the Claims

Column 18, Claim 10, Line 32, delete "nano tides" and insert --nanoparticles--.

Signed and Sealed this
Twentieth Day of February, 2024

Katherine Kelly Vidal
*Director of the United States Patent and Trademark Office*